(12) United States Patent
Gubler et al.

(10) Patent No.: US 11,527,764 B2
(45) Date of Patent: Dec. 13, 2022

(54) AMPHOTERIC ELECTROLYTE MEMBRANE WITH SELECTIVE AND BALANCED ION TRANSPORT PROPERTIES AND A REDOX FLOW BATTERY COMPRISING AN ELECTROLYTE MEMBRANE

(71) Applicant: PAUL SCHERRER INSTITUT, Villigen Psi (CH)

(72) Inventors: Lorenz Gubler, Untersiggenthal (CH); Fabio J. Oldenburg, Windisch (CH)

(73) Assignee: Paul Scherrer Institut, Villigen PSI (CH)

( * ) Notice: Subject to any disclaimer, the term of this patent is extended or adjusted under 35 U.S.C. 154(b) by 88 days.

(21) Appl. No.: 17/059,661

(22) PCT Filed: May 23, 2019

(86) PCT No.: PCT/EP2019/063362
§ 371 (c)(1),
(2) Date: Nov. 30, 2020

(87) PCT Pub. No.: WO2019/228904
PCT Pub. Date: Dec. 5, 2019

(65) Prior Publication Data
US 2021/0210770 A1    Jul. 8, 2021

(30) Foreign Application Priority Data
May 31, 2018    (EP) .................................... 18175340

(51) Int. Cl.
*H01M 8/0221* (2016.01)
*H01M 8/18* (2006.01)

(52) U.S. Cl.
CPC .......... *H01M 8/0221* (2013.01); *H01M 8/188* (2013.01)

(58) Field of Classification Search
CPC ...................................................... H01M 8/188
See application file for complete search history.

(56) References Cited

U.S. PATENT DOCUMENTS

2008/0199754 A1    8/2008  Scherer et al.
2011/0318644 A1   12/2011  Zhai et al.

FOREIGN PATENT DOCUMENTS

EP    3054518 A1    8/2016

*Primary Examiner* — Brian R Ohara
(74) *Attorney, Agent, or Firm* — Laurence A. Greenberg; Werner H. Stemer; Ralph E. Locher

(57) ABSTRACT

A membrane with high ion selectivity, balancing influence on vanadium transport in all-vanadium redox-flow environment, high physicochemical stability and potentially low cost is an amphoteric ion exchange membrane with defined ratio of anion and cation exchange capacity, in particular for redox flow batteries. The membrane includes a mechanically robust and chemically resistant base polymer film (matrix), ion exchange groups covalently bound to the polymer matrix, being a mixture of anion and cation exchange groups, a comonomer including two anion exchange groups per molecule to yield a ratio of anion exchange groups to cation exchange groups of 1.5-4 (50-300% excess of anion exchange groups over cation exchange groups) to balance transport of positively charged redox-active ions, a quaternary bonded alpha-C atom in comonomers to protect the resulting polymer sterically against chemical degradation. Optionally, additional functional constituents, such as cross-linkers and/or antioxidants are provided.

15 Claims, 6 Drawing Sheets

AMPHOTERIC ELECTROLYTE MEMBRANE WITH SELECTIVE AND BALANCED ION TRANSPORT PROPERTIES AND A REDOX FLOW BATTERY COMPRISING AN ELECTROLYTE MEMBRANE

The present invention describes an improved electrolyte membrane, in particular for electrochemical cells such as redox flow batteries (RFBs).

BACKGROUND OF THE INVENTION

Field of the Invention

Redox flow batteries comprise two electrolyte solutions on the positive and negative electrode, separated by an ion exchange membrane. The electrolyte solutions contain redox couples, typically charged species (ions), which allows the storage of electrical energy (during charging) and the generation of electrical energy (during discharge). The ion exchange membrane is required to allow the passage of desired ions and prevent the passage for ions involved in the energy storage (redox-active species) as well as solvent. The transport of ions across the membrane within one charge-discharge cycle must be balanced between the negative and the positive electrolyte in order to prevent accumulation of redox-active species and/or solvent at one side (electrolyte imbalances) which would result in capacity fading. Moreover, the membrane ought to be of low cost, mechanically robust, and stable in the respective chemical environment.

Redox flow batteries, originally developed in the 1970s, are being considered as stationary energy storage devices in the context of smoothing the increasing share of intermittent renewable energy production. Therefor they are implemented in various capacity levels, ranging from small units designed for frequency regulation up to units installed for peak-shaving and grid stabilization. The general assets of redox flow cells are high energy conversion efficiency, flexible design, high energy storage capacity, flexible location, deep discharge capability, high life-time and low maintenance cost compared with other energy storage technologies.

A redox flow battery uses two soluble redox couples as electroactive materials to store energy via oxidation and reduction reactions. In a typical set-up, the redox flow battery comprises two electrolyte reservoirs from which the electrolytes are circulated by pumps through an electrochemical reactor, consisting of a cell stack comprising a number of cells connected in series or parallel to enable reaction taking place at inert electrodes (FIG. 1). FIG. 1 shows schematically a representation of a redox flow battery (RFB), comprising an ion-exchange polymer as electrolyte membrane. Typically, each cell comprises a negative electrode, a positive electrode and an ion exchange membrane separator to allow diffusion of ions across the membrane while preventing the cross-mixing of the electrolyte solutions from these two reservoirs. The electrolytes contain redox-active species which can change their oxidation state reversibly upon charge and discharge. These active species are commonly multivalent ionic species, such as transition metal ions. The type of redox couple used in the electrolyte and the concentration of the species in their different respective oxidation states determine the electrochemical potential on the particular electrode. The potential difference between the negative and positive electrode, which is achieved by choice of different redox couples on the two sides, determines the electromotive force or voltage of the cell. The voltage of the cell is therefore specific to the chemical species involved in the reactions. The general reactions can be written as

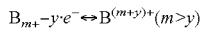

for the negative and positive electrode, respectively, where charge=→ and discharge=←. Examples of flow battery chemistries are the iron/chromium cell with $Cr^{2+}/Cr^{3+}$ ($E°=-0.41$ V vs. SHE) on the negative electrode and $Fe^{2+}/Fe^{3+}$ on the positive electrode ($E_o=0.77$ V vs. SHE), the bromine/polysulfide cell with $S_2^{2-}/S_4^{2-}$ ($E_o=-0.27$ V vs. SHE) on the negative electrode and $Br^-/Br_3^-$ on the positive electrode ($E°=1.09$ V vs. SHE), and the all-vanadium cell with $V^{2+}/V^{3+}$ ($E_o=-0.26$ V vs. SHE) on the negative electrode and $VO^{2+}/VO_2^+$ on the positive electrode ($E_o=1.00$ V vs. SHE).

The energy capacity of the redox flow battery is fully independent of its power, because the energy available is related to the electrolyte volume (amount of liquid electrolyte) and the power to the surface area of the electrodes.

In addition, the flow battery unit includes balance-of-plant components, such as pumps, tubing, power electronics, etc., to constitute an independent system. The repetitive unit of the stack of cells is made up of a polymer electrolyte, typically a cation or anion exchange membrane, which is sandwiched between flow field plates, through which the electrolyte solutions are pumped. As electrodes, porous carbon fibre structures are used.

The primary function of the electrolyte membrane is to provide pathways for ion conduction to ensure charge balance between positive and negative electrode. However, the passage of redox-active species, such as the transition metal ions, is not desired, as this leads to a cross-contamination of the electrolytes and a decrease in faradaic efficiency of the cell. Furthermore, if the passage of redox-active species with one charge-discharge cycle is unbalanced between the positive and the negative side, capacity fading is observed. The positive and negative electrolytes contain a common ion, for instance through the presence of supporting electrolyte, whose transport through the electrolyte is desired to ensure charge balance. Typically, the electrolytes used are aqueous solutions of redox couples, for instance $V^{3+}/V^{4+}$ and $VO^{2+}/VO_2^+$ (see above), and a strong acid, such as sulfuric acid, hydrochloric acid, methanesulfonic acid, etc., or combinations thereof, is used as a background electrolyte. In this case, the membrane should allow the passage of $H^+$ or (bi)sulfate anions (either cation or anion exchange membrane) and prevent the crossover of vanadium species.

As electrolyte membrane, typically dense ion exchange membranes are used, which could be cation exchange membranes, anion exchange membranes or a combination thereof (amphoteric ion exchange membranes). The resistance of the membrane should be as low as possible to minimize ohmic losses, concurrently the membrane should have a low permeability for the redox-active species. If redox-active species are still crossing the membrane, this transport should be balanced within one cycle in order to prevent a net vanadium flux and the associated capacity fading. Moreover, the membrane should be mechanically robust, chemically stable in the respective electrolyte solution, and be of low cost. In case of the use of cation redox couples in the electrolytes, the use of an anion exchange membrane suggests itself. However, with the high concentration of electrolytes commonly used in redox flow batteries on the order of mol/L, the Donnan exclusion of co-ions breaks down, thus leading to significant cation transfer through the membrane. Moreover, the chemical stability of anion exchange membranes is often insufficient. Cation exchange membranes are therefore more widely used. A typical and common cation exchange membrane is Nafion®, which is a perfluoroalkylsulfonic acid ionomer. Nafion® membranes are very widely used in RFBs, despite its high cost and high permeability for transition metal ions and water.

Description of the Related Art

US 2008/199754 A1 describes a method for preparing a radiation grafted fuel cell membrane with enhanced chemical stability and a membrane electrode assembly. The invention comprises a cation exchange membrane synthesized with a radiation grafting process of two comonomers onto a stable polymer backbone (i.e. the base polymer, for example ETFE or FEP). In the preferred embodiment, the comonomers α-methylstyrene (AMS) and methacrylonitrile (MAN) were incorporated, which yielded a higher stability in the fuel cell environment due to the α-protected C-atom present in both comonomers and an improved grafting kinetics compared to the use of neat AMS. The molar ratio of AMS:MAN in the grafted film is around 1:1. In the view of an application in vanadium redox flow batteries, the use of comonomers comprising an α-protected C-atom can also have a favorable effect on the stability, however the ion exchange membrane described in US 2008/199754 A1 is a pure cation exchange membrane. Similar to the cation exchange membrane Nafion™ described before, a high permeability of the transition metal ions and water can be expected, that would limit the efficiency of a redox flow battery. A further important problem is the imbalanced electrolyte transfer that is observed for all cation exchange membranes and that causes dramatic capacity fading.

EP 3 054 518 A1 describes an electrolyte membrane with selective ion transport properties and a redox flow battery comprising an electrolyte membrane. The preferred embodiment consists of a radiation-grafted membrane containing a comonomer introducing one cation exchange group and an additional comonomer introducing one anion exchange group to block the crossover of the redox-active ions. This yields an improved selectivity of the membrane (indicated as the figure of merit (FON) in Table 1 and therefore higher cell performance (FIG. 6). The ratio of anion and cation exchange groups can be tuned by varying the ratio of the two comonomers. With this approach the transport of vanadium could only be balanced in theory. In practice, this would require to incorporate a high excess of the comonomer donating the anion exchange group (indicated as the blocking comonomer), which would limit the conductivity of the membrane and thus the performance of the redox flow battery (the conductivity correlates to the concentration of cation exchange groups). Another problem of the preferred embodiment is the missing α-protection of the C-atom of the comonomer acrylonitrile (AN). This monomer thus undergoes oxidative degradation in the oxidative environment of redox flow batteries.

US 2011/0318644 A1 describes an amphoteric ion exchange membrane for use in vanadium redox flow batteries. The membrane is synthesized via a radiation-grafting method and comprises two different comonomers, one contributing one ion exchange group and the other contributing one anion exchange group. Similar to the amphoteric membrane described in EP 3 054 518 A1 this yields a significant reduction in the vanadium permeability and thus allows a higher efficiency compared to pure cation exchange membranes. The comonomer used as a precursor to gain the cation exchange group is styrene, which lacks stability in the oxidative environment of the vanadium redox flow battery due to the missing protection of the α-C atom. Furthermore, the ratio of anion and cation exchange groups can only be tuned by varying the monomer ratio, an excess of anion exchange groups would thus require an excess of the comonomer introducing the same, which would reduce the conductivity of the membrane and limits the efficiency in the cell. The problem of capacity fading due to imbalanced electrolyte transport can therefore not be solved satisfactorily with the membrane described in US 2011/0318644 A1.

SUMMARY OF THE INVENTION

It is the objective of the present invention to provide a membrane with high ion selectivity, a balancing effect on the transfer of redox-active species through the membrane, high physicochemical stability and low cost.

This objective is achieved according to the present invention by an amphoteric ion exchange membrane with selective ion transport properties, in particular for use in a redox flow battery, comprising:

a) a mechanically robust and chemically resistant base polymer film (matrix);

b) ion exchange groups covalently bound to the polymer matrix, being a mixture of anion exchange groups and cation exchange groups;

c) a comonomer comprising two anion exchange groups per molecule to yield a ratio of anion exchange groups to cation exchange groups of 1.5 to 4 (i.e. 50-300% excess of anion exchange groups over cation exchange groups) in order to balance the transport of positively charged redox-active ions;

d) a quaternary bonded alpha-C atom in the comonomers used to protect the resulting polymer sterically against chemical degradation; and d) optionally additional functional constituents, such as crosslinkers and/or antioxidants.

Therefore, this membrane has a high ion selectivity, high physicochemical stability, balances vanadium crossover and can be produced at low cost due to the selection of a base polymer film and the ion exchange groups in a defined ratio.

Preferably, the membrane is produced via radiation induced grafting, comprising the steps of:

a) exposing the base polymer to ionizing radiation to introduce active sites;

b) exposing the irradiated base polymer to a mixture of monomers comprising i) a monomer containing a cation exchange group or a precursor monomer yielding a cation exchange group in a subsequent step, ii) a monomer containing an anion exchange group or a precursor monomer yielding the anion exchange group in a subsequent reaction step; iii) optional additional monomers, such as a crosslinker and/or antioxidant; and c) in case of the use of precursor monomers for ion exchange sites, post-treatment of the grafted film to introduce the ion exchange sites is performed.

With respect to chemical stability, cost and ion conductivity, the base polymer can be a dense or porous fluoropolymer, such as fluorinated ethylene propylene (FEP), perfluoroalkoxy polymer (PFA), ethylene-tetrafluoroethylene (ETFE), polyvinylidene fluoride (PVDF), ethylene-chlorotrifluoroethylene (ECTFE), or copolymers comprising the monomers tetrafluoroethylene (TFE), vinylidene fluoride (VDF), hexafluoropropylene (HFP), chlorotrifluoroethylene (CTFE), trifluoroethylene (TrFE), or a polyolefin, such as polyethylene (PE) or polypropylene (PP), or a polymer from the polybenzimidazole (PBI) family.

For the pre-treatment prior to the grafting, the ionizing radiation can be an electron beam with energy above 100 keV.

Preferably, the monomer used as a precursor monomer to yield negatively charged cation exchange sites is α-methylstyrene, α-fluorostyrene, α-bromostyrene, α-methoxysterene, α,β,β-trifluorostyrene. Here, the cation exchange function is a sulfonic acid introduced in a post-functionalization reaction with chlorosulfonic acid followed by the hydrolysis in water or an alkaline solution. Alternatively, the sulfonation is performed in the gas phase using $SO_3$.

Alternatively, the monomer already contains the cation exchange site, such as α-methylstyrene sulfonic acid or a salt thereof or 2-acrylamido-2-methyl-1-propanesulfonic acid or a salt thereof.

Further, the monomer used as a precursor monomer to yield positively charged anion exchange groups balancing the vanadium transport, with protected alpha-position is 2-methyleneglutaronitrile (MGN), glycidylmethacrylate (GMA) or,) which after grafting is post-functionalized with an amidoximation reaction with hydroxylamine to yield two anion exchange functions per molecule. In the case of glycidylmethacrylate a functionalization to yield nitrile functions is performed prior to the amidoximation. In the case of glycidylmethacrylate the reaction with L-amino acid, trialkylamine, or iminodipropionitrile is performed prior to the amidoximation.

The cation exchange groups (negatively charged) and anion exchange groups (positively charged) are incorporated with an excess of anion exchange groups due to the chemical nature of the comonomer providing the anion exchange groups, containing two precursor functions per molecule to yield a net excess of fixed positive charges (i.e. anion exchange groups) in the electrolyte swollen membrane in order to balance the transport of redox-active ions across the membrane and to improve capacity retention. A comonomer ratio of AMS:MGN of 1:1 in the membrane is thus yielding a significant excess of anion exchange groups of 100%. The exact ratio can further be tuned by varying the monomer ratio. The material described here balances the flux of redox-active species for operation current densities of 40-200 mA $cm^2$ by comprising a 50%-400% excess of positive charges to negative charges.

A superior redox flow battery is achieved according to the present invention by a redox flow battery comprising a membrane according to any of the claims 1 to 12 is used as a membrane electrolyte.

Preferred redox flow batteries can be achieved when the negative electrolyte solution comprises an aqueous solution of sulfuric acid as background electrolyte and $V^{2+}/V^{3+}$ as redox-active species, and wherein the positive electrolyte solution comprises an aqueous solution of sulfuric acid as background electrolyte and $VO^{2+}/VO_2^+$ as redox-active species.

The membrane as claimed by the present invention therefore has the advantage over the prior art that the membrane shows 1.) High ion selectivity (high proton conductivity but concurrently low vanadium crossover) due to the excess of anion exchange groups without compromising the comonomer ratio
2.) balanced ion transport and hence a lower net vanadium flux and capacity fading
3.) higher stability due to the α-protected C-atom in all comonomers used.

than a comparable membrane without the defined ratio of anion/cation exchange functions and the alpha-C protected polymer chain.

Preferred examples of the present invention are discussed hereinafter in detail with reference to the attached drawings.

Table 1 an overview of the properties of the different membranes of Example 1 and the comparative materials Nafion® and FAP-450.

DETAILED DESCRIPTION OF THE INVENTION

In the present invention, a potential low cost electrolyte membrane with improved ion selectivity and transport properties to that of the reference materials Nafion® (a cation exchange membrane) and FAP-450 (Fumatech®, an anion exchange membrane) is disclosed.

Figure 1:
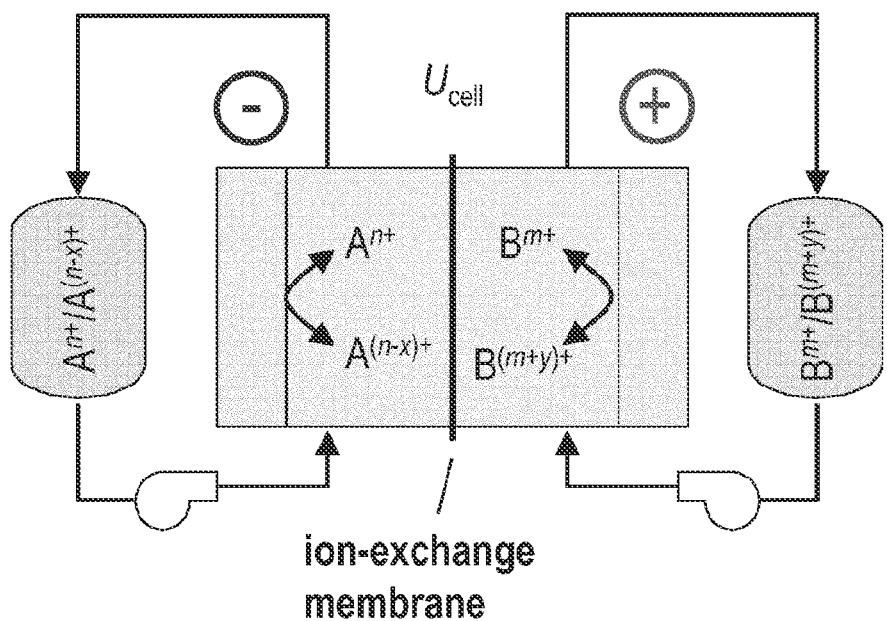
FIG. 1 schematically a representation of a redox flow battery (RFB), comprising an ion-exchange polymer as electrolyte membrane.
Figure 2:
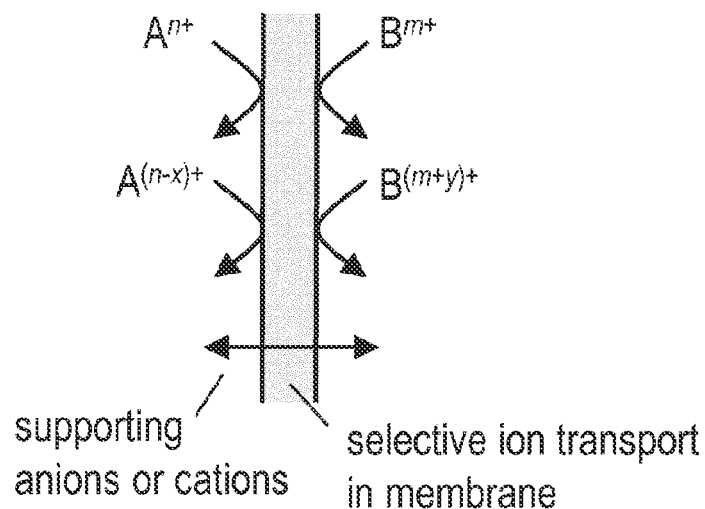
FIG. 2 a sketch of the primary target of the present invention in terms of conductivity and blocking of the redox active components to cross the membrane.

By combining anion and cation exchange groups, supporting ions are enabled to cross the membrane (resulting in low area resistance), however the crossover of highly charged vanadium ions is disfavored due to coulombic repulsion forces (FIG. 2). This combination of ionic species yields significantly improved selectivity compared to the reference materials (defined as the selectivity parameter in Table 1).

The vanadium ions are positively charged with valence states of +2 ($V^{2+}$) and +3 ($V^{3+}$) in the negative electrolyte and +2 ($VO^{2+}$) and +1 ($VO_2^+$) in the positive electrolyte.

Figure 3:
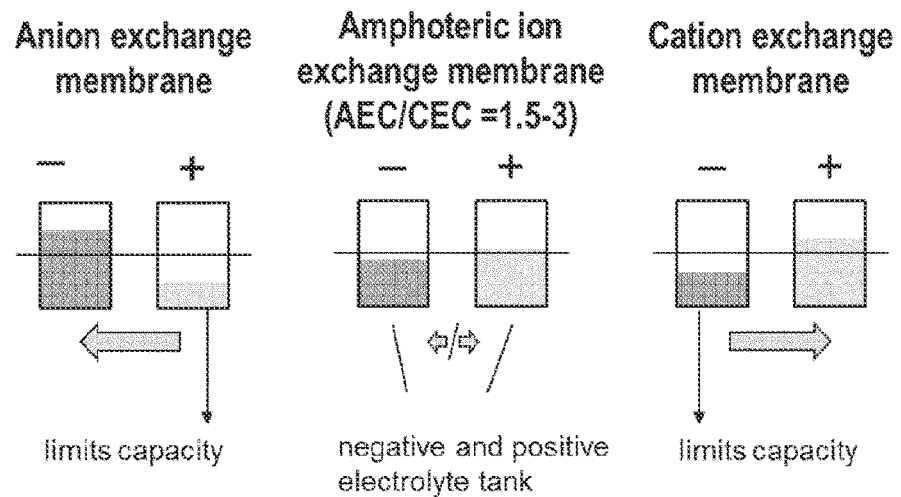
FIG. 3 a sketch of the secondary target of the present invention to balance vanadium crossover with a defined ratio of cation and anion exchange groups.
Figure 10:
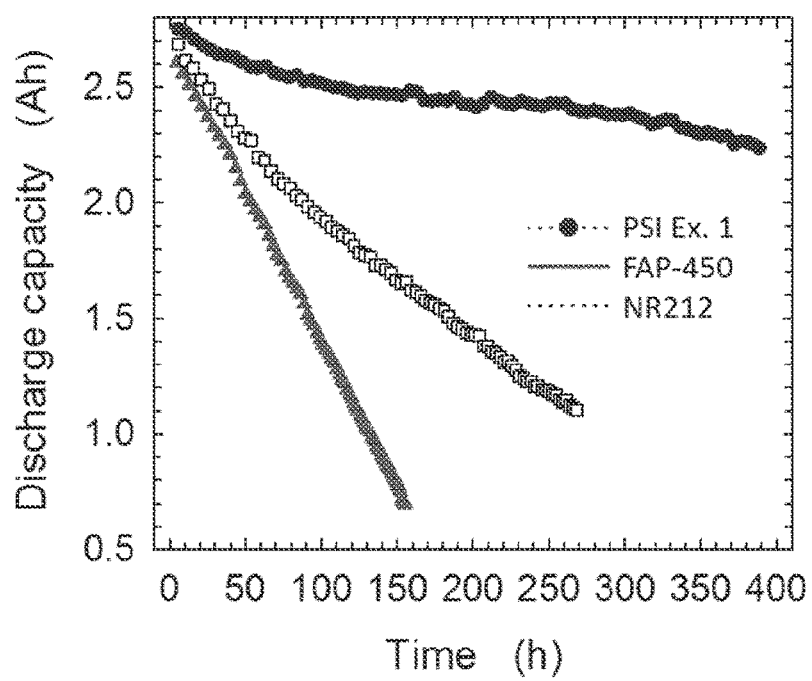
FIG. 10 the discharge capacity of a vanadium redox-flow cell assembled with Example 1 and the comparative materials Nafion® and FAP-450 operating at a constant current of 120 mA $cm^{-1}$.

The fixed positive charges on the membrane repulse the vanadium ions depending on their valence state. On average, vanadium ions in the negative electrolyte have higher valence states and are thus more hindered from crossing the membrane compared to vanadium ions on the positive side. This allows balancing of the net transport of vanadium ions between the negative and positive electrolyte by optimizing the ratio of cation- to anion exchange groups (FIG. 3). As a result, the capacity fading related to electrolyte imbalances is drastically improved (FIG. 10).

Preferred embodiments of the present invention discloses a method to introduce these functionalities into a pre-existing inert polymer base film by means of radiation-induced grafting. Radiation grafting is a versatile and scalable technique to modify a polymer substrate by forming a graft copolymer to introduce desirable properties into the material. Irradiation of the base film by ionizing radiation (gamma, electrons) introduces active sites, from which in the subsequent grafting reactions polymer chains are grown from a monomer or mixture of monomers amenable to radical induced polymerization. The monomer mixture may be a liquid solution or gaseous mixture of monomers and diluent(s). Post treatment of the grafted film may be necessary to modify the grafted moieties to obtain the final desired functionalities.

One ionomer constituent embodies the negatively charged ionogenic constituent, for instance a sulfonic acid group, which upon swelling of the ionomer in water yields mobile protons and a fixed sulfonate anion. The density of negatively charged sites determines the cation exchange capacity, which itself determines the conductivity of the ionomer.

Another ionomer constituent embodies a positively charged constituent, or a constituent that is turned into a positively charged moiety when exposed the electrolyte solution, such as an amine or amidoxime that is protonated. The density of positively charged sites determines the anion exchange capacity, which decreases the crossover of vanadium ions, predominantly of vanadium ions with high charge states (being present in the negative electrolyte). It is conceivable that the membrane may contain several types of blocking units for the different redox active species in the two electrolytes.

Figure 4:
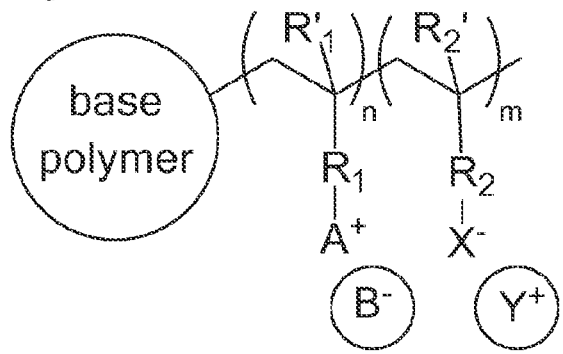
FIG. 4 a schematic structure of the graft copolymer consisting of the inert base polymer and grafted functional units.

FIG. 4 shows a schematic structure of the graft copolymer consisting of the inert base polymer and grafted functional units. $R_i$ and $R_i'$ (i=1,2), respectively, is an alkyl or aryl organic rest or a combination thereof. $A_+$ and $X^-$ are ionic groups fixed on the grafts (e.g., $—SO_3^-$), $B^-$ and $Y^+$ the corresponding mobile ions (e.g., $H^+$). n and m are molar fractions of respective monomer units in the grafts and vary between 10 and 90%.

It is a key feature of the presented invention that the presence of the anion exchange groups significantly increases the selectivity of ion transport in the membrane by reducing the crossover of redox-active species while the total conductivity is not or only insignificantly affected. This is achieved by incorporating a comonomer, that contributes two anion exchange groups per molecule (i.e. the MGN). Compared to previous membrane technologies described in the state of the art, this allows even at a monomer ratio of 1:1 a significant excess of anion exchange groups (100%). In other words, the selectivity parameter $\alpha$ of the membrane, defined according to W. Xie et al., Journal of The Electrochemical Society, 163 (1) A5084-A5089 (2016) and given in the following, is enhanced:

$$\alpha = \frac{R \cdot T}{F} \cdot \frac{1}{i_x \cdot R_\Omega} \quad (1)$$

where R is the ideal gas constant, R=8.314 J/(mol·K), F the Faraday constant, F=96485 As/mol, and T the temperature taken as 298 K. The parameters $i_x$ and $R_\Omega$ are the V(IV) crossover current density measured in a diffusion cell and the ohmic resistance of the redox flow single cell containing the membrane, respectively. The latter two parameters are a function of the membrane used.

The electrolyte membrane may contain, in addition to the cation and anion exchange groups, further constituents for specific purposes, such as crosslinker and/or antioxidants.

The present invention will now be described in detail with reference to a few preferred embodiments thereof. In the following description, numerous specific details are set forth in order to provide a thorough understanding of the present invention. It will be apparent, however, to one skilled in the art, that the present invention may be practiced without some or all of these specific details.

In the invention disclosed herein, these functional groups are introduced into a pre-existing yet inert polymer film by radiation induced graft copolymerzation of suitable monomers amenable to radical polymerization and, if necessary, suitable post-treatments to obtain the final functionalized and ion-conducting membrane. The radiation-grafted membrane may be prepared from a variety of base polymer films including fluoropolymers, such as PTFE, FEP, PFA, ETFE, PVDF, PVF, PCTFE, ECTFE, or polyolefins such as PE, PP and their copolymers, or polyamides, or polybenzimidazoles, or polyesters. In a preferred embodiment, the base polymer film is a partially fluorinated polymer, such as ETFE, PVDF, or ECTFE or copolymers derived from these.

Figure 5:
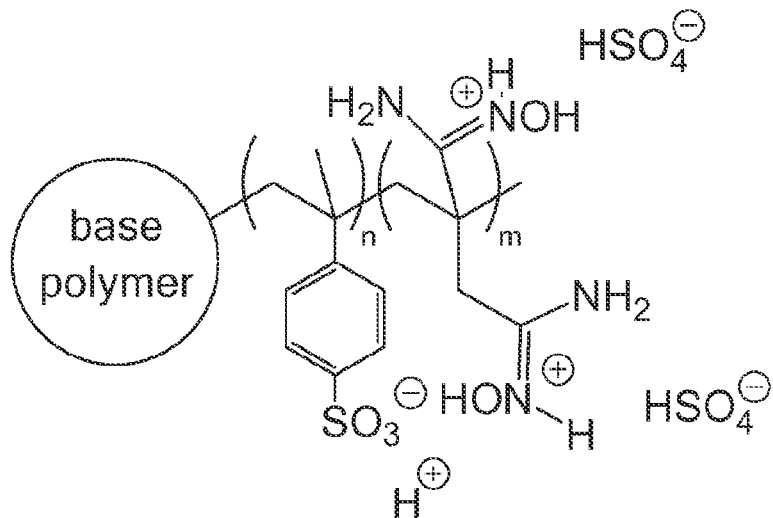
FIG. 5 a schematic structure of the preferred embodiment base polymer, grafted monomers and ionogenic functionalities.
Figure 6:
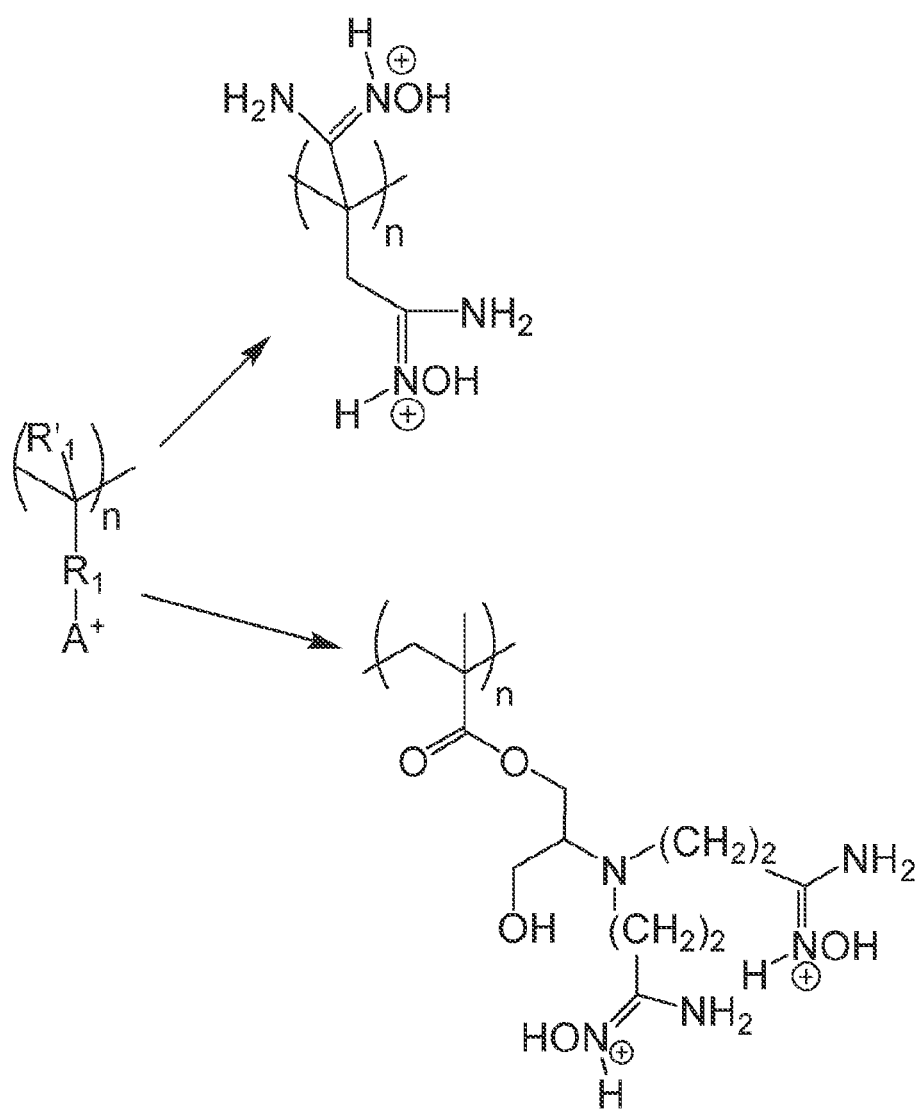
FIG. 6 a schematic representation of the structure of the preferred positively charged anion exchange groups; Synthesis may include a further functionalization step of the grafted precursor, namely the amidoximation.
Figure 7:
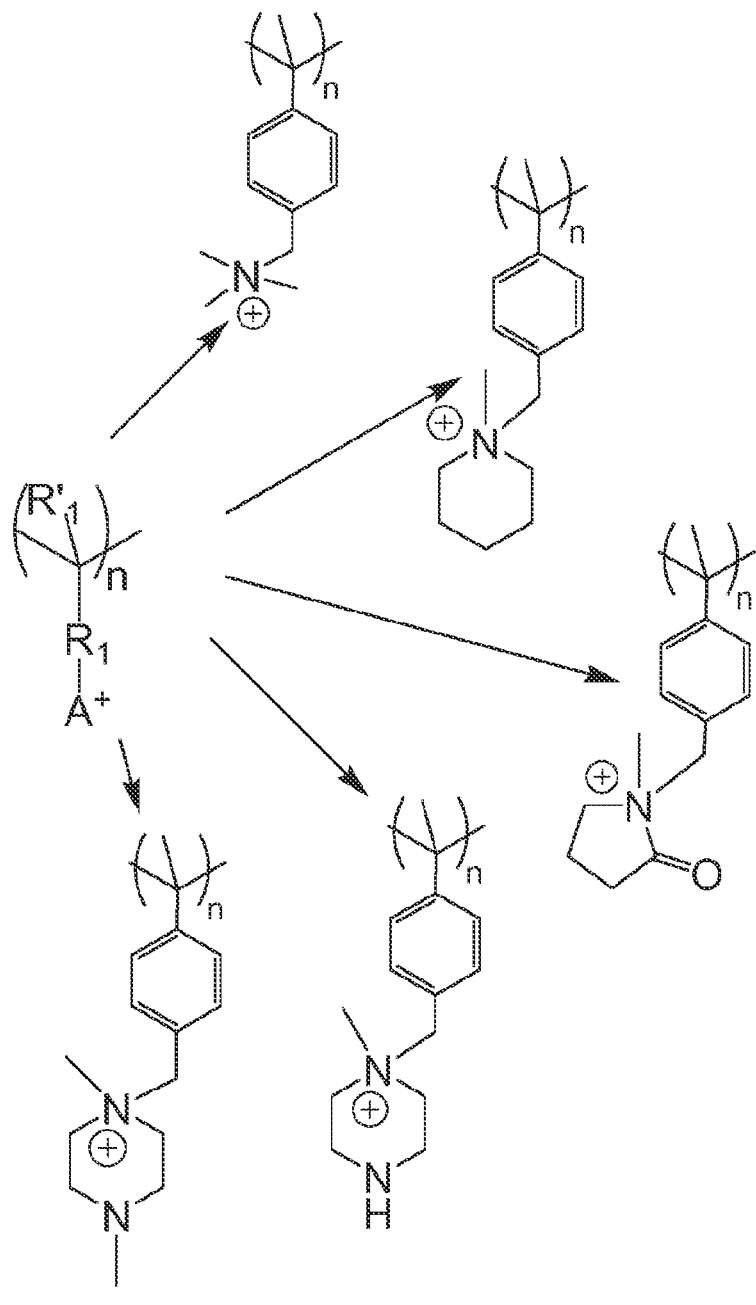
FIG. 7 a schematic representation of the structure of further positively charged anion exchange groups; Synthesis may include a further functionalization step of the grafted precursor, namely the amination.
Figure 8:
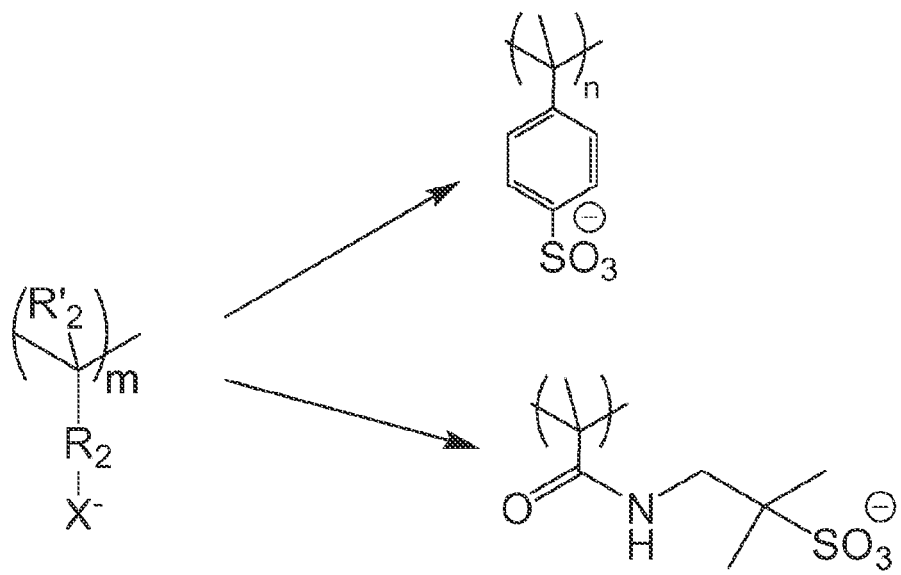
FIG. 8 a schematic representation of the preferred structure of negatively charged cation exchange groups; Synthesis may include a further functionalization step of the grafted precursor, namely the sulfonation.

FIG. 5 shows a schematic representation of the structure of the ionogenic groups of the preferred embodiment of this invention.

Activation of the film is performed using ionizing radiation, such as gamma, hard x-rays, or electron beam. The film may be pre-irradiated or simultaneously radiated when the base polymer is exposed to the monomer mixture. In case of the pre-irradiation method, the irradiated substrate may be stored at reduced temperature and/or under inert atmosphere if the reactive sites are unstable. In a preferred embodiment, the base film is irradiated in air with a high energy (>100 keV) electron beam.

The physical form of the monomer for grafting may be as a gas or a liquid, and the monomer may be either pure or diluted with a solvent or inert material and/or as a mixture with one or more additional monomers. Any radically active monomer may be used including vinyl, styrenic or acrylic monomers. Monomers can be selected according to the properties that are desired for the membranes. To introduce ion exchange groups, monomers having acidic, basic, salt or amphoteric functionality or their precursors may be selected. Non-limiting examples of monomers having acidic, basic, amphoteric, or salt functionality include α-methylstyrene sulfonic acid or a salt thereof, or 2-acrylamido-2-methyl-1-propanesulfonic acid or a salt thereof. Monomers that can be used as precursors for the introduction of negatively or positively charged fixed groups may also be used. Non-limiting examples include α-protected styrenic monomers such as α-methylstyrene, α-fluorostyrene, α-bromostyrene, α-methoxystyrene, or α,β,β-trifluorostyrene, α-fluorostyrene, 2-methyleneglutaronitrile, methacrylonitrile, glycidylmethacrylate or 1- or 2-(chloromethyl)-4-isopropenylbenzene. The grafted polystyrenic chains are derivatized in a subsequent step using methods known in the art to yield acidic, basic, or amphoteric functionalities in the membrane. For example, anion-exchange groups can be introduced by means of subsequent amination to yield quaternary ammonium groups, and cation exchange groups can be introduced by treating with strong acids such as chlorosulfonic or sulfuric acids or sulfur trioxide dissolved in halogenated solvents or gaseous sulfur trioxide. In a preferred embodiment, the monomer is yielding the cation exchange group is α-methylstyrene, which after grafting is sulfonated in chlorosulfonic acid solution and subsequently hydrolyzed in water to obtain (α-methyl)-styrene-sulfonic acid grafts. The preferred precursor yielding two anion exchange groups is 2-methyleneglutaronitrile, which is functionalized with an amidoximation reaction with hydroxylamine dissolved in a polar organic solvent to yield the amidoxime, which is protonated when exposed to the acidic electrolyte solution to yield induced fixed cationic groups.

The ratio of the monomers, the cation exchange precursor monomer and anion exchange precursor co-monomer, in the reaction mixture is adapted to adjust the ratio of the grafted monomer units in the graft copolymer according to the specific copolymerization behavior or the two monomers, which is governed by the radical copolymerization kinetics of the two monomers chosen according to the theory of Mayo and Lewis. Therefore, the tuning of the fraction of ionogenic or precursor comonomer units in the grafts is sensitive to achieve the desired ratio of anion to cation exchange functions in the final ion exchange membrane.

In a preferred embodiment, α-methylstyrene is co-grafted with 2-methyleneglutaronitrile at a molar ratio of 1.2:1, which yields a molar fraction of α-methylstyrene and 2-methyleneglutaronitrile in the grafts of around 0.5, respectively. Through the choice of the ratio of cation and anion exchange monomer units in the grafted chain, the transport properties of vanadium ions can be tuned. In one extreme case, only cation exchange units are present in the grafts, thus the net vanadium transport over extended cycling periods is favored towards the positive electrolyte. In the other extreme case, the grafts contain only anion exchange monomer units. In this case, net vanadium flux is favored towards the negative electrolyte resulting in electrolyte accumulation on the negative side. In both cases constant electrolyte rebalancing (e.g. via cross-mixing) must be performed, which lowers the efficiency of the battery system.

In addition to the monomers mentioned above, additional monomers may be included in the monomer mixture for specific purposes. For instance, crosslinking monomers, such as divinyl benzene, bis(vinyl phenyl)ethane, diisopropenylbenzene, or diacrylates, can be used to modify the swelling or liquid crossover properties, or stability and durability of such membranes. In addition, monomer units carrying antioxidants may be incorporated into the grafted chain to protect the polymer from oxidative attack.

EXAMPLES

The following Examples and Comparative Examples are provided for the purpose of further illustrating the present invention but are in no way to be taken as limiting.

Example 1

ETFE base film (DuPont Tefzel® 100LZ, 25 µm thickness) was irradiated in air using an MeV class electron beam facility with a dose of 50 kGy and subsequently stored at −80° C. The grafting reaction was performed in glass reactors under nitrogen atmosphere. The grafting reaction mixture was composed as follows: 65% (v/v) monomer solution (α-methylstyrene/2-methyleneglutaronitrile at a monomer ratio of 1.2/1)+35% (v/v) dichloromethane. Irradiated films of different sizes (7×7 cm, 15×10 cm and 30×70 cm) were introduced into the grafting solution. The glass reactor containing the grafting solution and the irradiated films was purged with $N_2$ for 1 h. Then, the reactor was placed in a thermostatic water bath held at 50° C. for the duration of the grafting reaction. After removal of the films from the reactor, the grafted films were washed with acetone for 18 h and dried under vacuum at 50° C. The reaction time was adjusted such that a graft level, defined as the weight increase upon grafting with respect to the initial weight of the base film, of around 40 was obtained.

Amidoximation of the nitrile groups of the grafted 2-methyleneglutaronitrile (MGN) units was performed in a small glass reactor using 2 M solution of hydroxylamine hydrochloride in 2-methylenepyrolidone/$H_2O$ (volumetric ratio of 9:1). The pH value of the solution was adjusted to 7 by adding KOH solution. Subsequently, the grafted films were introduced into the prepared solution and placed in a thermostatic water bath at 70° C. for 4 hours. FTIR analysis of the samples indicated that, within the error of the measurement, the nitrile groups have completely reacted.

Sulfonation of the grafted and amidoximated films was carried out in a 2 L glass reactor using a 10% solution of chlorosulfonic acid in dichloromethane. Grafted films were introduced into the solution and gas bubbles adhering to the film were removed with a glass rod. After stirring for 4 h at room temperature the sulfonated films were removed from the reaction mixture, washed with ultra-pure water and hydrolyzed at 70° C. in pure water for 16 h.

Comparative Example 2

The cation exchange membrane Nation® NR212 is used as Comparative Example 2. The membrane was pretreated by immersion in water or electrolyte depending on the performed analysis.

Comparative Example 3

The anion exchange membrane Fumatech® FAP-450 is used as Comparative Example 3. The membrane was pretreated by immersion in water or electrolyte depending on the performed analysis.

Membrane Characterization

The membranes were characterized for their key properties in the context of the application in redox flow batteries.

The ohmic resistance of a redox flow cell is largely influenced by the conductivity of the membrane in the respective electrolyte solution(s). Therefore, the ohmic resistance was measured in an assembled all-vanadium redox flow cell at room temperature comprising carbon felt electrodes (SGL SIGRACELL® GFD4.6 EA) and the respective membrane as polymer electrolyte. A redox flow test system (Model 857) by Scribner Associates was used to operate the cell. Both the negative and the positive electrolyte compartment were filled with an aqueous solution containing commercially available (Oxkem, Reading, UK) 1.6 M vanadium sulphate solution (average oxidation state is 3.5) in 2 M $H_2SO_4$ and 0.05 M $H_3PO_4$. The ohmic area specific resistance $R_\Omega$ of the cell was determined in the uncharged state at open circuit potential from the intercept of the impedance spectrum in Nyquist representation with the real axis at the high frequency end.

The vanadium ion permeance at room temperature of prepared membranes was determined using self-made diffusion cells consisting of two round bottom flasks separated by the membrane. The donor compartment was filled with a 1 M solution of $VOSO_4$ in 2 M $H_2SO_4$ while the receiving one was filled with 1 M solution of $MgSO_4$ in 2 M $H_2SO_4$. Solutions in both compartments were stirred in order to prevent concentration polarization at the membrane's surface. At regular time intervals the concentration of diffused $VO^{2+}$ ions in the receiving compartment was measured using UV-Vis spectroscopy. The permeance of vanadium-ions, expressed as crossover current density $i_x$, was then calculated according to $$i_x = \frac{dc}{dt} \cdot F \cdot \frac{V}{A} \quad (2)$$

where dc/dt is the rate of change of V(IV) concentration in the right (receiving) compartment, F is the Faraday constant, V is the volume of the receiving compartment, and A is the exposed membrane area. Based on the ohmic resistance $R_\Omega$ and the vanadium permeance $i_x(V^{4+})$, the selectivity parameter $\alpha$ (cf. equation 1) was calculated, which is a figure of merit and indicates the suitability of a membrane material for application in a redox flow cell. The higher the number, the more suitable the membrane. An ideal membrane should have low ohmic resistance as well as low metal-ion diffusivity.

To determine the rate of capacity fading due to imbalanced vanadium crossover, assembled cells were operated at a constant current density of 120 mA $cm^{-2}$ for 100 cycles (within termination voltages of 0.8 and 1.6 V). After each cycle, the discharge capacity was obtained from the discharge time at constant current. To avoid rebalancing and other operation and maintenance (O&M) procedures, the electrolyte transport must be balanced to maintain the capacity of the battery. A capacity fading of 5% after 100 hours was obtained, which is not related to the electrolyte but to carbon felt degradation and is thus accepted when only comparing membranes.

Table 1 shows key properties of membranes for redox flow applications, consisting of the anion and cation exchange capacity, the capacity fading rate, ohmic resistance $R_\Omega$ in the vanadium redox flow cell, the permeance of vanadium(IV) $i_x(V^{4+})$ across the membrane, and the selectivity parameter $\alpha$, which comprises the parameters $R_\Omega$ and $i_x$. The capacity retention and selectivity parameter a of the preferred membrane embodiment showing superior characteristics compared to Nation® NR212 and Fumatech® FAP-450 membranes (Comparative Example 2 and 3) are evident.

Figure 9:
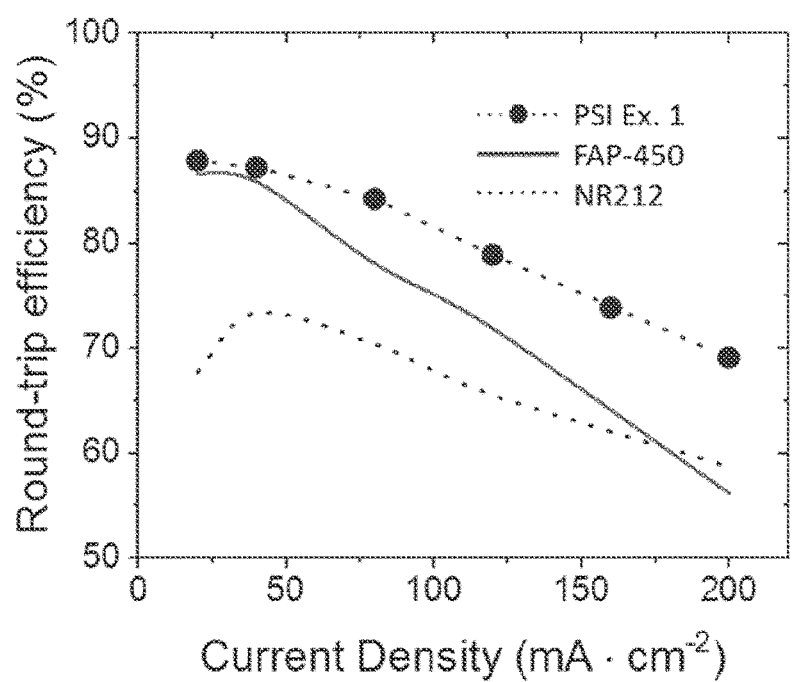
FIG. 9 the round-trip efficiency a vanadium redox-flow cell assembled with Example 1 and the comparative materials Nafion® and FAP-450 operating at different current densities.

To validate the redox-flow relevant membrane characteristics presented in Table 1, the round-trip efficiency of the membrane Example 1 and the two comparative Examples 2 and 3 was determined from cycle experiments at different current densities (FIG. 9). The round-trip efficiency is a product of the coulombic and the voltage efficiency and thus comprises the resistance of the cell and the V-crossover at the same time. For all current densities an improvement of round-trip efficiency of the membrane according to the present invention (Example 1) in comparison to the benchmark materials NR212 (Comparative Example 2) and FAP-450 (Comparative Example 3) is evident. At low current densities, the anion exchange membrane FAP-450 shows high efficiencies as well, which however significantly decreases for higher current densities due to the high membrane area resistance. The improved selectivity and amphoteric nature of the Example 1 allows high energy efficiencies in the whole range of considered current densities.

The net volumetric flux of electrolyte across the membrane over extended cycling periods was determined from the electrolyte volume of the discharged electrolyte after each cycle. The volumetric flux was accompanied by a net vanadium flux in the same direction and capacity fading resulting from vanadium deficiency in one electrolyte. By incorporating both, anion and cation exchange capacities in the Example 1 embodiment (with an excess of anion exchange capacity (anion to cation exchange capacity ratio of 1.5-4) the net volumetric flux was significantly decreased and capacity fading due to electrolyte imbalances mitigated (Table 1, FIG. 10).

TABLE 1

|  | Example 1 | Comparative Example 2 | Comparative Example 3 |
|---|---|---|---|
| Graft level (%) | 40 | — | — |
| Anion exchange capacity (mmol$g^{-1}$) | 0.43 | 0 | 2.9 |
| Cation exchange capacity (mmol$g^{-1}$) | 1.23 | 0.94 | 0 |
| Volumetric Flux (μL $h^{-1}$ $cm^{-2}$) (−, + indicate the direction towards the negative and positive side, respectively) | −0.03 | 20.9 | −37.8 |
| Capacity fading after 100 h of operation (%/100 h) | 3.7 | 25.9 | 44.4 |
| Cell ohmic resistance $R_\Omega$ ($\Omega \cdot cm^2$) | 0.65 | 0.45 | 0.98 |
| Vanadium permeance $i_x(V^{4+})$ (mA $cm^{-2}$) | 0.20 | 0.80 | 0.19 |
| Selectivity parameter $\alpha$ (—) | 197.3 | 71.0 | 137.8 |

The invention claimed is:

1. An ion exchange membrane with selective ion transport properties suitable for use in a redox flow battery, the ion exchange membrane comprising:
   a) a mechanically robust and chemically resistant base polymer film;
   b) ion exchange groups covalently bound to the polymer film, being a mixture of anion exchange groups and cation exchange groups;
   c) at least one comonomer comprising a ratio of anion exchange groups to cation exchange groups per molecule of from 1.5:1 to 4:1 to balance a transport of positively charged redox-active ions; and
   d) a quaternary bonded alpha-C atom in the comonomers used to protect a resulting polymer sterically against chemical degradation.

2. The ion exchange membrane according to claim 1, which further comprises additional functional constituents including at least one of crosslinkers or antioxidants.

3. The ion exchange membrane according to claim 1, wherein the membrane has characteristic of having been produced via radiation induced grafting, including steps of:
   a) exposing the base polymer to ionizing radiation to introduce active sites;

b) exposing the irradiated base polymer to a mixture of monomers including:
  i) a monomer containing a cation exchange group or a precursor monomer yielding a cation exchange group in a subsequent step; and
  ii) a monomer containing an anion exchange group or a precursor monomer yielding the anion exchange group in a subsequent reaction step; and
c) post-treatment of the grafted film to introduce the ion exchange sites, for a use of precursor monomers for ion exchange sites.

4. The ion exchange membrane according to claim 1, wherein the base polymer is a fluoropolymer, polybenzimidazole or polyolefin.

5. The ion exchange membrane according to claim 3, wherein the ionizing radiation is an electron beam with energy>100 keV.

6. The ion exchange membrane according to claim 1, wherein the monomer bearing or yielding cation exchange sites is:
  a) α-methylstyrene sulfonic acid or a salt thereof or 2-acrylamido-2-methyl-1-propanesulfonic acid or a salt thereof; or
  b) a precursor monomer: α-methylstyrene, α-fluorostyrene, α-bromostyrene, α-methoxystyrene, or α, β, β-trifluorostyrene.

7. The ion exchange membrane according to claim 1, wherein the monomer used as a precursor monomer to yield anion exchange sites is 2-methyleneglutaronitrile, glycidylmethacrylate, or 1- or 2-(chloromethacrylate).

8. The ion exchange membrane according to claim 1, wherein the cation exchange site is a sulfonic acid group, introduced to the styrenic grafted precursor monomer units via sulfonation followed by hydrolysis.

9. The ion exchange membrane according to claim 1, wherein the anion exchange groups are created by amidoximation of 2-methyleneglutaronitrile.

10. The ion exchange membrane according to claim 1, wherein the anion exchange group is a quaternary ammonium group, introduced to 1- or 2-(chloromethyl)-4-isopropenylbenzene grafted monomer units via quaternization using a tertiary amine selected from the group consisting of trimethylamine, N-methylpiperidine, 1-methylpyrrolidine, 1-methylpiperazine, and 1,4-dimethylpiperazine.

11. The ion exchange membrane according to claim 10, wherein the anion exchange sites are created by a reaction of glycidyl methacrylate units in grafted chains with L-amino acid, trialkylamine, or iminodipropionitrile followed by amidoximation.

12. The ion exchange membrane according to claim 11, wherein grafted monomers account for 20-60% of weight with respect to a weight of the base polymer.

13. A redox flow battery, comprising a membrane according to claim 1 used as a membrane electrolyte.

14. The redox flow battery according to claim 13, which further comprises:
  a negative electrolyte solution including an aqueous solution of sulfuric acid or a mixture of sulfuric and hydrochloric acid as a background electrolyte and $V^{2+}/V^{3+}$ as redox-active species; and
  a positive electrolyte solution including an aqueous solution of sulfuric acid or a mixture of sulfuric and hydrochloric acid as a background electrolyte and $VO^{2+}/VO_2+$ as redox-active species.

15. The redox flow battery according to claim 13, wherein a ratio of an electrolyte on a negative and a positive side remain constant due to balanced ion crossover, resulting in a discharge capacity loss of less than 5% after 100 hours of operation.

* * * * *